United States Patent
Mannheim Astete et al.

(10) Patent No.: US 11,541,650 B2
(45) Date of Patent: Jan. 3, 2023

(54) AUTOMOTIVE LAMINATE WITH EMBEDDED WIRE CIRCUIT

(71) Applicant: AGP AMERICA S.A., Ciudad de Panamá (PA)

(72) Inventors: Mario Arturo Mannheim Astete, Lima (PE); Charles Stephen Voeltzel, Lima (PE)

(73) Assignee: AGP America S.A., Panama (PA)

( * ) Notice: Subject to any disclaimer, the term of this patent is extended or adjusted under 35 U.S.C. 154(b) by 58 days.

(21) Appl. No.: 16/499,719

(22) PCT Filed: Mar. 28, 2018

(86) PCT No.: PCT/IB2018/052154
§ 371 (c)(1),
(2) Date: Sep. 30, 2019

(87) PCT Pub. No.: WO2018/185619
PCT Pub. Date: Oct. 11, 2018

(65) Prior Publication Data
US 2020/0338866 A1    Oct. 29, 2020

Related U.S. Application Data (60) Provisional application No. 62/479,295, filed on Mar. 30, 2017.

(30) Foreign Application Priority Data

Jul. 27, 2017 (CO) .................... NC2017/0007456

(51) Int. Cl.
*G02F 1/1335* (2006.01)
*C09K 11/06* (2006.01)
(Continued)

(52) U.S. Cl.
CPC ............ *B32B 37/142* (2013.01); *B32B 17/10* (2013.01); *B32B 17/10036* (2013.01);
(Continued)

(58) Field of Classification Search
CPC ........ B32B 17/10385; B32B 17/10036; B32B 17/10376; B32B 17/10761;
(Continued)

(56) References Cited

U.S. PATENT DOCUMENTS 3,409,759 A    11/1968 Boicey et al.
3,601,583 A    8/1971 Fujiwara
(Continued)

FOREIGN PATENT DOCUMENTS

EP    1710104 A2 * 10/2006    ............... H05B 3/86
FR    2118266 A    7/1972
(Continued)

OTHER PUBLICATIONS

Machine_English_Translation_EP_1710104_A2; Hallik, Matthias; Vehicle and laminated glass for vehicle; Oct. 11, 2006; EPO; whole document (Year: 2006).*

*Primary Examiner* — Tahseen Khan
(74) *Attorney, Agent, or Firm* — The Morales Law Firm; Joseph L. Morales (57) ABSTRACT

Laminated glazings with embedded wire circuits, have many uses. But, due to the higher cost of manufacture, they are not widely used. This invention provides a process to reduce the cost of production for embedded wire laminated glazing. Rather than embedding the wire one interlayer at a time, several circuits are produced on the same sheet, cut out and then inserted into the interlayer of each separate laminate during assembly, reducing the direct labor and capital investment required.

21 Claims, 7 Drawing Sheets

(51) Int. Cl.

| | | |
|---|---|---|
| G02F 1/1334 | (2006.01) | |
| C09K 11/02 | (2006.01) | |
| G02F 1/17 | (2019.01) | |
| G02F 1/157 | (2006.01) | |
| B32B 37/14 | (2006.01) | |
| B32B 17/10 | (2006.01) | |
| B32B 38/00 | (2006.01) | |
| B60J 1/02 | (2006.01) | |
| H05B 3/86 | (2006.01) | |
| B60J 1/00 | (2006.01) | |
| B60R 16/023 | (2006.01) | |
| B60R 16/03 | (2006.01) | |

(52) U.S. Cl.
CPC .. *B32B 17/10376* (2013.01); *B32B 17/10385* (2013.01); *B32B 17/10761* (2013.01); *B32B 17/10871* (2013.01); *B32B 17/10981* (2013.01); *B32B 38/0004* (2013.01); *B60J 1/02* (2013.01); *H05B 3/86* (2013.01); *B32B 2605/00* (2013.01); *B60J 1/002* (2013.01); *B60R 16/0231* (2013.01); *B60R 16/03* (2013.01); *H05B 2203/017* (2013.01); *H05B 2203/031* (2013.01)

(58) Field of Classification Search
CPC ........ B32B 17/10871; B32B 17/10981; B32B 38/0004; B32B 37/142; B60J 1/02; H05B 3/86
USPC ...................................................... 428/195.1
See application file for complete search history.

(56) References Cited

U.S. PATENT DOCUMENTS

| | | | |
|---|---|---|---|
| 3,729,616 A | | 4/1973 | Gruss et al. |
| 3,745,309 A | | 7/1973 | Gruss |
| 3,778,898 A | | 12/1973 | Gruss et al. |
| 3,888,711 A | | 6/1975 | Breitnet |
| 4,209,687 A | | 6/1980 | Bethge et al. |
| 4,321,296 A | * | 3/1982 | Rougier ................... H05B 3/86 428/113 |
| 5,282,301 A | | 2/1994 | Roentgen et al. |
| 5,445,694 A | | 8/1995 | Gillner et al. |
| 5,643,804 A | | 7/1997 | Arai et al. |
| 5,792,298 A | | 8/1998 | Sauer et al. |
| 2005/0238857 A1 | * | 10/2005 | Day ................. B32B 17/10174 428/209 |
| 2007/0044542 A1 | * | 3/2007 | Barguirdjian ..... B32B 17/10036 73/73 |
| 2009/0169877 A1 | * | 7/2009 | Dixon ...................... H05B 3/86 428/339 |
| 2010/0085261 A1 | * | 4/2010 | Baranski ............... H01Q 21/30 343/713 |
| 2015/0301367 A1 | * | 10/2015 | Mennig ............ B32B 17/10761 156/60 |
| 2017/0355858 A1 | * | 12/2017 | Loccufier .......... B32B 17/10036 |
| 2020/0369007 A1 | * | 11/2020 | Bauerle ............... B32B 37/1009 |
| 2021/0387514 A1 | * | 12/2021 | Klein ...................... G02F 1/172 |

FOREIGN PATENT DOCUMENTS

| | | | |
|---|---|---|---|
| GB | 1097719 A | | 1/1968 |
| WO | 2004082934 A1 | | 9/2004 |
| WO | WO-2004082934 A1 * | 9/2004 | ............ B32B 17/10 |
| WO | 2011131958 A1 | | 10/2011 |

\* cited by examiner

AUTOMOTIVE LAMINATE WITH EMBEDDED WIRE CIRCUIT

FIELD OF THE INVENTION

The presently disclosed invention is directed to a laminated automotive glazing having an embedded wire circuit with lower cost as well as the method used to create said glazing.

BACKGROUND OF THE INVENTION

Laminated glazings with embedded wire circuits, have many uses including but not limited to defrosting, radio frequency reception, capacitive rain sensing, occupant sensing, touch control, lighting, data transmission, RFID, control signals and power. The design of planar circuits for said functions are known and the art and readily transferable to embedded wire designs with undo effort or by those with average skill.

However, due to their higher cost to manufacture, embedded wire circuits have not been widely used other than for defrosting. Discussion shall focus on defrosting however, the process can be applied to any other application utilizing an embedded wire circuit.

Automotive windows are often equipped with electrical heating circuits so as to maintain clear unobstructed vision by heating the glass to help keep it clear of ice, snow and fog. On most vehicle models, a rear window defogger, once an option, has been standard equipment for many years.

Most rear windows are made of tempered safety glass. Tempered safety glass is glass that has been heat treated to increase its strength. Tempered safety glass, when it fails, breaks into small beads with dull edges.

Windshields, on the other hand, are made from two layers of annealed glass held together by a thin sheet of plastic interlayer. The interlayer is typically a clear thermo plastic. For automotive use, the most commonly used interlayer is polyvinyl butyl (PVB). In addition to polyvinyl butyl, ionoplast polymers, polyurethane (PU) and ethylene vinyl acetate (EVA) can also be used. When a windshield fails, the glass breaks into shards with sharp edges but the plastic layer holds the shards together helping to maintain the structural integrity of the glass.

As tempered glass is only comprised of a single layer of glass, heated circuits can only be applied to the side of the glass adjacent to the interior of the vehicle. The circuits are typically produced by screen printing the circuit, using an ink containing powdered silver and fine powdered glass, on the flat unbent glass. When the glass is heated to bend it, the ink is "fired" into the glass surface. That is, the powdered glass in the ink reaches its softening point and is fused to the glass surface. The silver maintains conductivity resulting in a printed circuit of sorts on the glass. The typical 12 volt rear window defroster will have a circuit produced by screen printing a silver ink having in the range of 65% to 75% silver by weight, with line widths in the range of 0.3 mm to 0.8 mm and line to line spacing in the range of 30 mm to 35 mm. As the potential exist for the vehicle occupants to make contact with the defroster lines on the glass, the power is limited so as to produce a maximum temperature rise of no more than 40 to 45° C. The circuit also operates on a timer so that it will not remain on long enough to overheat.

On windshields, screen print silver can only be used on limited areas of the glass. Otherwise, the lines would be distracting and interfere with the vision of the driver.

Figure 1A:
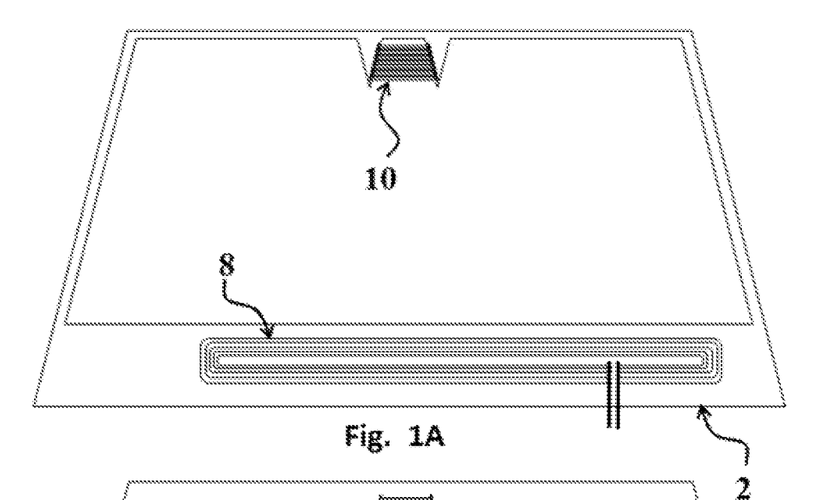
FIG. 1A shows a laminated windshield with embedded wire camera area and HWA defrosters.
Figure 1B:
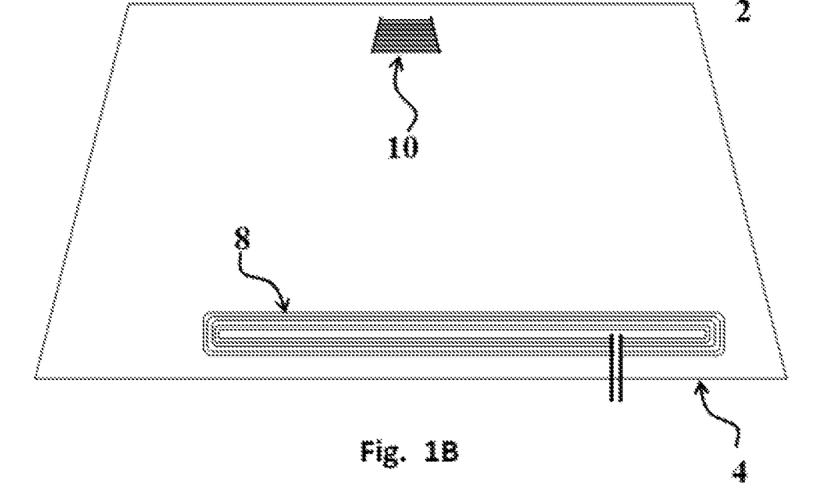
FIG. 1B shows an interlayer with embedded wire camera area and HWA defrosters for windshield of FIG. 1A.

On some car models, the windshield wipers, in the rest position, are parked below the hood line. This is done to reduce wind noise and drag. Many of these vehicles must be equipped with a heated wiper area defroster (HWA 8), as shown in FIGS. 1A and 1B, to melt any snow and ice that may become trapped there. HWA 8 circuits require a higher power density than rear windows due to the potential for large quantities of ice to become trapped.

On vehicles that have cameras mounted to the glass of the windshield, a defroster circuit is needed to keep the area clear. The hot air from the defroster will not reach the area as it is blocked by the camera 10; and as glass is a poor conductor of heat, the area will not clear in a reasonable amount of time just from conduction. Also, while a common deice specification for rear window defoggers is 80% clear after 20 minutes at an ambient of −20 C with 0.5 mm of ice, vehicles that use cameras for safety functions often require a deice time that is at least twice as fast so as to enable camera based safety functions such as lane departure and forward collision warnings. This is especially true in the case of autonomous vehicle that do not need to have the windshield clear to begin operating.

While screen print silver defrosters have been used for HWA 8 and camera 10 defrosters, the higher power densities required make the design challenging. A typical rear window defogger, as described, is designed to have a power density in the range of 4 to 6 watts per square decimeter. On the other hand, HWA 8 and camera 10 circuits operate in the 10 to 15 watts per square decimeter range. On HWA 8 defrosters, the line widths tend towards 2 mm to 6 mm. The silver is expensive and can weaken the glass. On the camera defrosters 10, the line width tend towards the minimum width that is possible, 0.3 mm to 0.6 mm, which presents printing challenges. In addition, the silver lines cannot be spaced more than 30 mm to 35 mm apart so they must sometimes pass through the camera field of view which is not desirable.

Figure 2A:
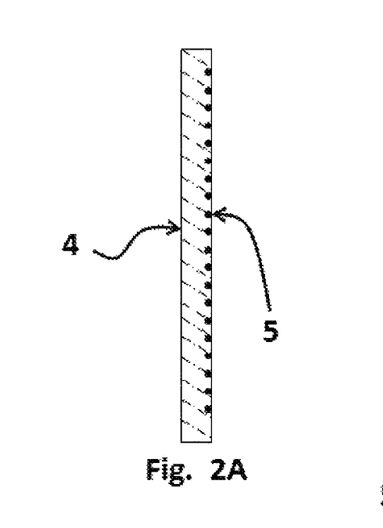
FIG. 2A shows a camera area defroster circuit cross section.
Figure 2B:
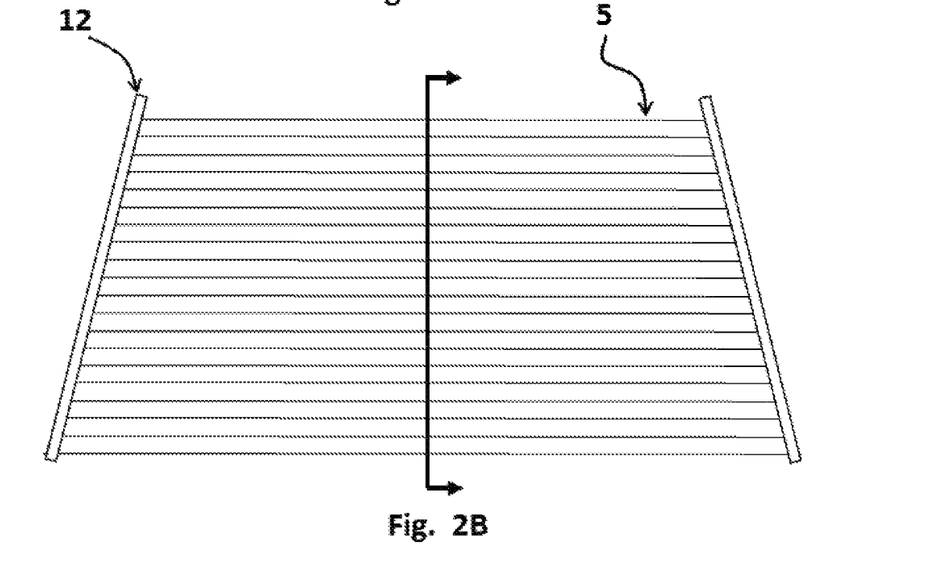
FIG. 2B shows a camera area defroster circuit.

A good alternative to screen print silver is wire embedded heating as shown in FIGS. 1A and 1B. The defroster circuits are produced by embedding wires 5 into the plastic sheet or interlayer 4 that is used to bond the two glass layers of a laminated glazing to each other (FIG. 2A). This limits the use of this technology to laminated glass. For windshields, 12 volts circuits are made by embedding 20 micron or smaller diameter tungsten wire in the plastic layer. In FIG. 2B, that represent the camera 10 area, the wires run in the horizontal direction from vertical bus bars 12 running along the left and the right of the area. In the hole windshield, typically, the wires run in the vertical direction from horizontal bus bars running along the top and the bottom of the windshield. The bus bars are hidden by black paint on the surface four and the surface two of glass. Being surface four the glass surface on the interior of the vehicle and surface two the inner surface of the exterior glass layer. While a short drive away time would be desirable, the power density is limited by the power available from the vehicle electrical system and as a result is typically in the same range as a rear window.

Embedded wire defroster circuits, in addition to the very thin wire that can be used, have the additional advantage of having significantly more uniform heating than screen print silver. Glass is a poor conductor of heat. With silver lines at a spacing of 35 mm, the temperature differential between lines can be substantial. At steady state, at 17.5 mm from a silver line at a temperature of 65 C, the temperature may be only 45° C. With an embedded wire circuit, with the same power density, and 4 mm-8 mm wire spacing, the temperature differential will be less than 10° C., more likely less than 5° C. and the peak temperature will be reduced correspondingly. Due to the wire being closer to the outside surface of the glass, the temperature will also be 1° C.-2° C. higher on the outside surface. The energy put into the circuit is thus used more efficiently. In fact, for the same average power density, an embedded wire circuit will deice faster than a screen print silver.

With these advantages, we would expect to see more vehicles with embedded wire defrosters. We do not see lots of vehicles with embedded wire defrosters, primarily because of the higher cost associated with embedded wire. The primary cost drivers are the labor-intensive process and the high capital investment required.

To embed wire in a plastic interlayer for a laminate, a high precision computer numeric controlled (CNC) machine is needed. In addition to an X and Y axis, the head must also be able to move up and down, in Z and also be able to rotate so as to be able to follow the tool path. It is also highly desirable to have an automatic tool changer, a soldering tool and a cut off tool for the wire, and a cutting tool. This complexity adds to the expense of the machine.

The bed of the machine must be large enough to accommodate the largest windshield that will be made. Windshields are getting larger and larger. Some automotive panoramic windshields have an area in excess of 2 square meters, while truck and bus windshields as large at 4 square meters are known and not uncommon.

Only a small number of companies make machines for embedding wire. As a result, the equipment tends to be expensive. Most are of those sold are used for embedding antenna loops on radio frequency identification cards and have a working envelope of less than 1 meter by 1 meter. A large automotive windshield may require a working envelope 3 to 4 times as large. The term wire shall include but not be limited to round, solid, uninsulated copper and/or tungsten wire. The term, can include other conductive materials as well as stranded and insulated wire. The shape of the conductor may also be rectangular. A typical tungsten wire ranges from a minimum diameter of about 9 microns up to around 125 microns. Copper wire can range from about 20 microns to about 250 microns.

The process starts with the plastic interlayer sheet placed on the bed of the CNC wire embedding machine. First the bus bars are applied. The bus bars are made from thin tinned copper strips. This part of the operation can be done by hand if needed or by the machine if so equipped. Then, the wire is embedded using heat or ultrasound. Feed rates are limited as the speed of the head must not place excess tension on the fine wire as it is played out from the spool or pull the embedded wire from the interlayer.

It is important that the interlayer not be stretched or wrinkled as the wire and bus bars are added in order to prevent lamination and optical defects. Due to the thickness and stiffness of the bus bars and the wire, the interlayer 4 must be cut into sheets for processing. Roll to roll is not possible. Even in sheet form, the competed sheets with the wire and bus bar are usually not stored in stacks of more than 10-20.

The wire embedding machines must be operated in an expensive clean room to prevent contamination of the laminates. As the typical automotive interlayer 4 has a glass transition point of 20° C., the clean room must also be kept at approximately 15° C. The throughput of one machine will depend upon the pattern, but to keep up with just one high volume program, several large machines may be needed.

A 1.5 square meter windshield, as an example, would require a sheet of interlayer having a block size greater than what will fit on a machine having a working envelope of 1 m×1 m. Smaller machines in this range are available but are primarily targeted at the electronics industry. To double the size of the working envelope from one square meter to two square meters will typically more than double the price as the same level of accuracy is still needed. However, even a 2 square meter envelope may not be sufficient depending upon the horizontal and vertical dimensions of the part. Windshields, are rarely square or rectangular, but trapezoidal. Assuming that our part is 1.4 m×1.1 m, that will establish our minimum size. But to be able to accommodate other larger parts, it would make sense to size the machine to the largest dimensions anticipated an example of which is 2 m×1.5 m.

One of the problems faced when designing wire embedded heating circuits for an HWA 8 and a camera 10 comes from the difference in size between the two. The HWA 8 circuit can be several times that size of the camera 10 area circuit. While the power density may be the same for both, due to the higher current of the HWA 8, it is not practical to use the same wire for both circuits. In the case where the same part has a HWA 8 and a camera 10, the embedded machine must have a second embedding tool or the tool must be manually changed. This also adds to the cost of producing this type of circuit.

As a result, the cost of production, for embedded wire, can be several times that of a screen print silver circuit.

SUMMARY OF THE INVENTION

Having examined the drawbacks of screen print silver and embedded wire defroster circuits, it can be appreciated that it would be desirable to produce a defroster that did not have the limitations described.

The primary cost drivers are the result of the low throughput of the traditional process in which full interlayer sheets are processed on at a time.

Figure 3:
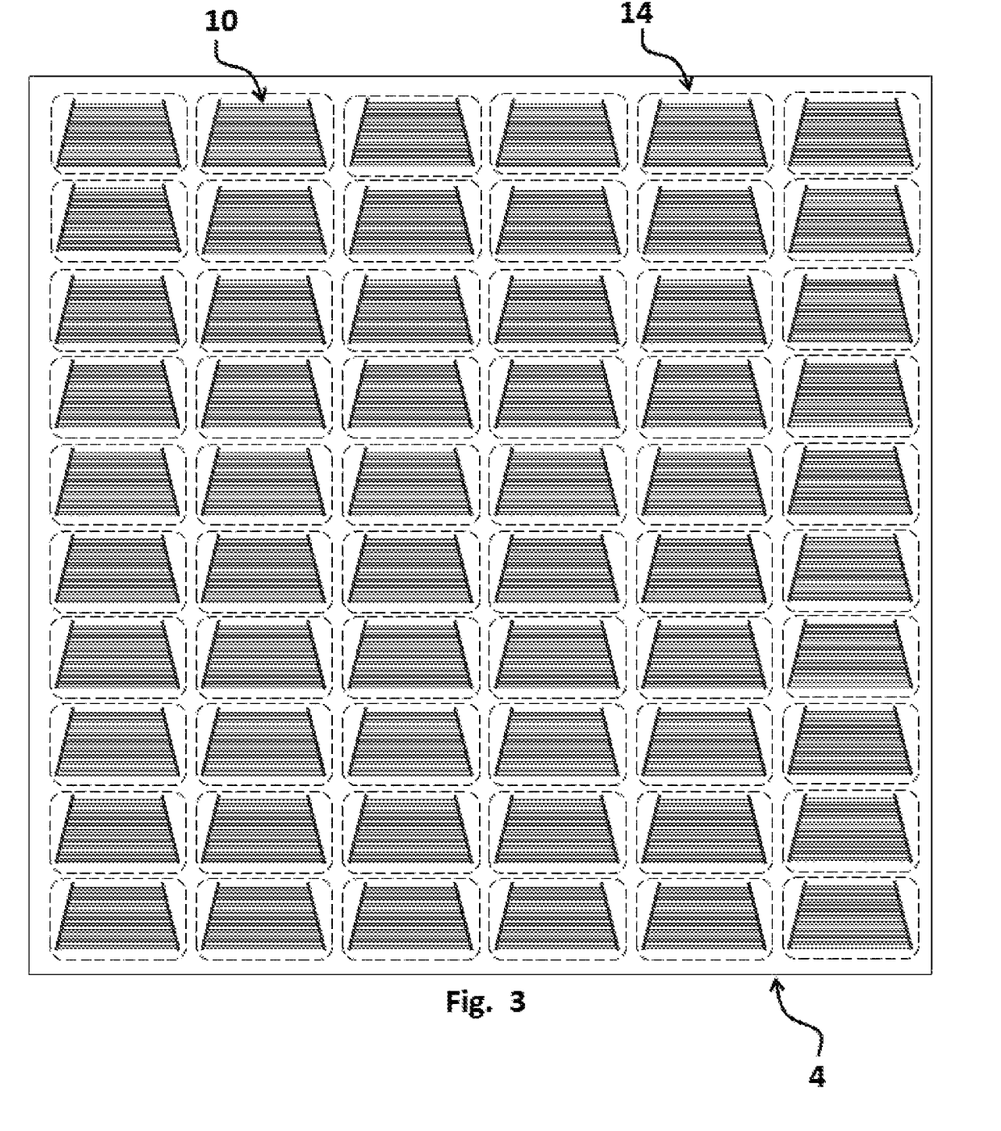
FIG. 3 shows an interlayer sheet with multiple camera defroster circuits.
Figure 4:
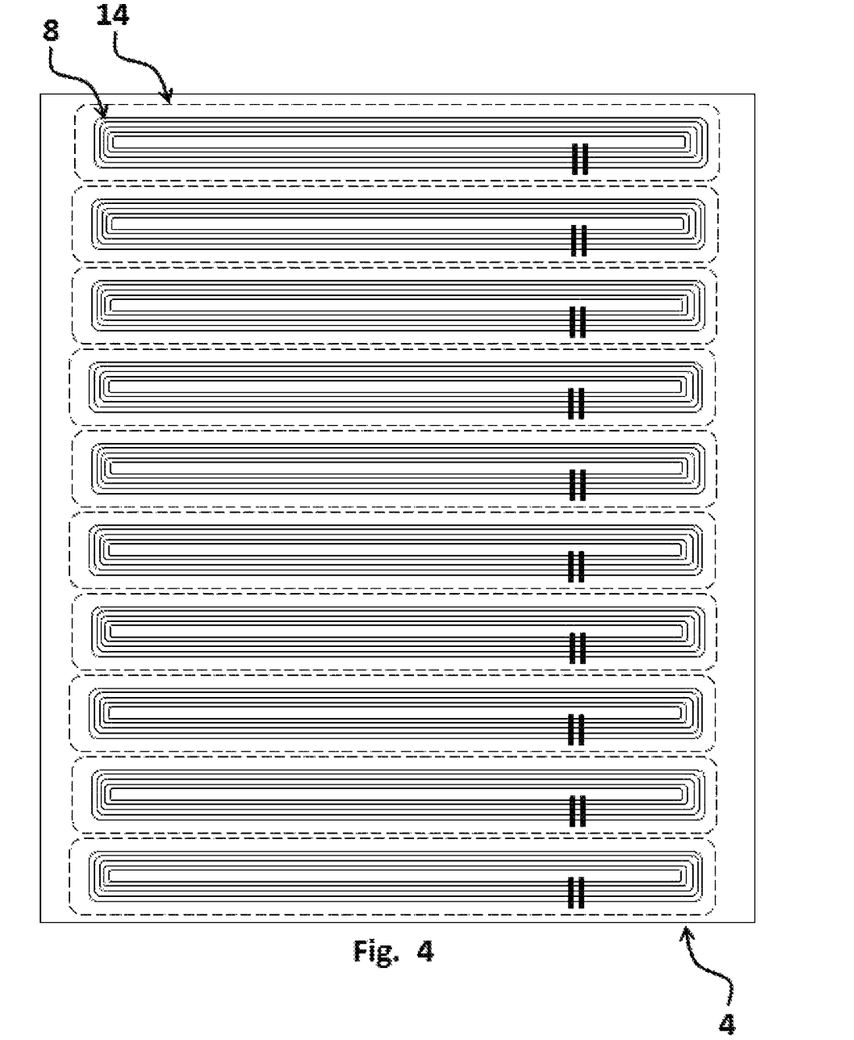
FIG. 4 shows an interlayer sheet with multiple camera HWA circuits.
Figure 5:
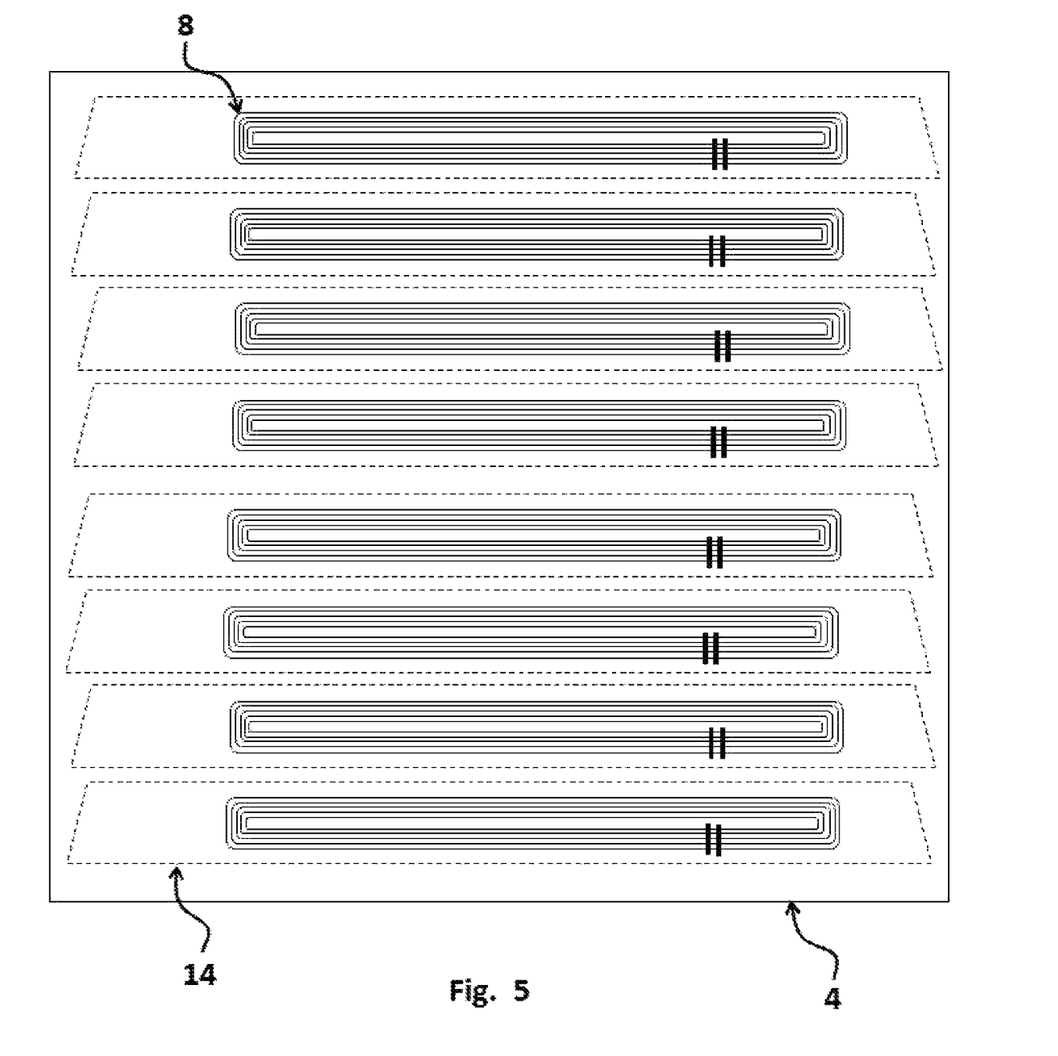
FIG. 5 shows an interlayer sheet with multiple camera HWA circuits.
Figure 6A:
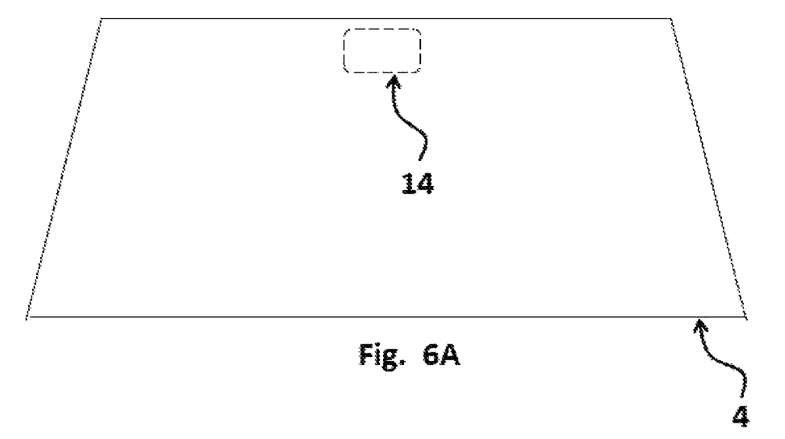
FIG. 6A shows an interlayer with embedded cut out for wire camera area and for HWA defrosters for windshield of FIG. 1.
Figure 6B:
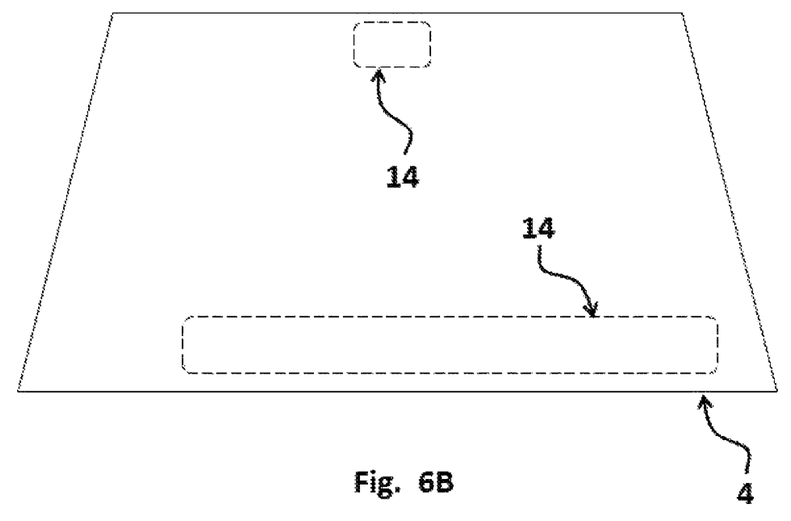
FIG. 6B an interlayer with embedded cut outs for wire camera area and HWA defrosters for windshield of FIG. 1.

Rather than process an interlayer sheet for a single windshield, embedding the circuits one at a time, multiple circuits are embedded on a single sheet. This allows the use of a smaller interlayer sheet and the use of a smaller less expensive machine. Examples are shown in FIGS. 3, 4 and 5. The defroster circuits are then cut apart and separated from the sheet which also reduces the storage space needed. The individual sheets of interlayer for the laminated glass are then cut with openings that are the size of the circuit as shown in FIGS. 6A and 6B.

Figures 7A, 7B:
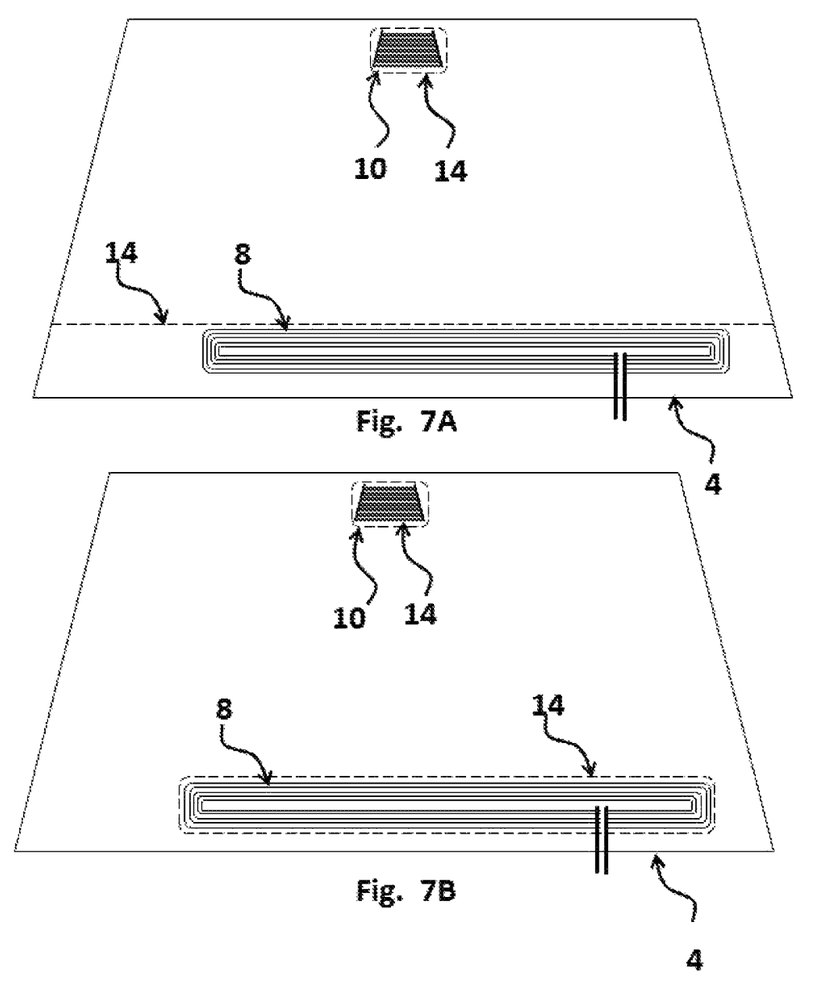
FIG. 7A shows an interlayer with embedded wire camera area and HWA defrosters for windshield of FIG. 1.
FIG. 7B shows an interlayer with embedded wire camera area and HWA defrosters for windshield of FIG. 1.

When the laminate is assembled, the interlayer sheet with the circuit is inserted into the cut out. By accurately cutting the interlayer and circuits, a close match is achieved and the parting line is invisible for all practical purposes in the finished laminate. A splice may be needed, to keep the circuit in place, depending upon the shape of the bent glass and the circuits. Heat (from a soldering iron) or a solvent (alcohol or plasticizer) can be used to splice the interlayer, if needed, on which the circuit has been embedded to the larger sheet as shown in FIGS. 7A and 7B.

The assembly is then placed in an autoclave where heat and pressure are applied and the circuit becomes a permanent part of the laminate. When a premium, higher priced interlayer is required, and an HWA is included, the entire bottom portion of the interlayer sheet can be made using a less expensive ordinary interlayer as shown in FIGS. 5, 6A and 7A.

Advantages include:
Lower cost
High throughput
Reduced storage requirements
Allows use of much smaller less expensive machines.
Reduces the number of machines required.
Reduces labor.
Reduces capital.
Reduces floor space.
Reduces the number of change overs.
Reduces the quantity of more expensive (wedge, solar control, sound deadening, etc.) interlayer required.

BRIEF DESCRIPTION OF THE FIGURES

These features and advantages of the present invention will become apparent from the detailed description of the following embodiments in conjunction with the accompanying drawings, wherein.

REFERENCE NUMERALS

2 Glass
4 Interlayer
5 Wire
8 Heated wiper area defroster
10 Camera defroster
12 Bus bar
14 Cut

DETAILED DESCRIPTION OF THE INVENTION

The cost of the conventional process of embedding wire is driven by the low throughput and resulting high capital, floor space and labor required.

In the case of a heated windshield, where substantially all of the surface area must have wire embedded, consuming several hundreds of meters of wire, the one at a time approach is the only way to make the circuit on an XY type machine. Multiple full windshields circuits can be produced on a CNC machine that operates in a manner similar to that of a lathe. The interlayer is wrapped around a large (1.5 m diameter) drum, bus bars are applied to the interlayer, and the wire is embedded as the drum spins. While this works well for these types of circuits, it is not possible to make the more complex circuits required for the camera and HWA.

On a windshield having both a camera and a HWA, the total heated area is less than 10% of the windshield surface area. The camera area is in the range of 1 to 2 decimeters squared or less than 2% of the typical 1.5 square meter windshield. Only 2-4 meters of wire are needed. The HWA is larger but still only need cover the area from just below the wipers to just about the area heated by the hot air blower system. A large HWA would be in the range of 5-10 square decimeters or 3.5% to 7% of the surface area and uses just 10-20 meters of wire.

FIG. 1A shows a windshield having both a camera 10 defroster and an HWA 8. FIG. 1B shows the interlayer of the prior art with the embedded wire circuits prior to lamination. Note that the black paint covers and hides the bus bars on each circuit.

When processing interlayers for parts with camera 10 and/or HWA 8 circuits, one sheet at a time, up to 90% of the cycle time is taken up by placing and locating the sheet of interlayer 4 on the machine and then removing and stacking off after the wire has been embedded. Part to this is due to the large size and the soft, limp composition of the interlayer 4 which makes them difficult to handle.

If both an HWA 8 and a camera 10 defroster are needed a tool change over must be made. Due to the differences between the sizes of the two circuits, they will rarely be able to use the same wire and sometimes not even the same bus bar.

By producing multiple copies of each circuit on separate sheets of interlayer, and then combining the circuits with the larger sheet during assembly of the laminate just prior to the autoclave, these disadvantages are greatly reduced. This method also enables the use of less expensive machines with smaller beds.

It should be noted that the embedded wire circuit could have functionalities as the followings: a resistive heating circuit, an antenna circuit, rain sensing circuit, power supplying circuit, occupant sensing circuit, data transmitting circuit, touch sensitive circuit, lighting circuit, control signal circuit among others.

DESCRIPTION OF EMBODIMENTS

Referring to FIG. 1A, in an embodiment of the invention, a 1.4 m×1.2 m windshield, has a camera 10 defroster comprised of two 3 mm×100 mm bus bars and 3 meters of 45 micron diameter tungsten wire, and a HWA 8 with two 6 mm×100 mm bus bars and 18 meters of 80 micron copper wire. To meet demand for the laminate, a production line runs this part 24/7 at an average rate of 1 every 60 seconds for two weeks every month.

Processing one sheet at a time, a machine having an envelope of at least 1.4 m×1.2 m can produce sixteen interlayers per hour as shown in Table 1. Therefore four machines are needed and must have a utilization rate of 96% to meet the demand.

Sixty of the camera 10 defroster circuits cans be embedded on a 1 square meter interlayer in 1,522 seconds and a rate of 142 per hour (see Table 2 and FIG. 3). Ten HWA 8 circuits (FIG. 4) can fit on a 1 meter sheet and can be produced at a rate of 70 per hour (Table 3). Two machines, with an envelope of 1 m×1 m are needed and must have a utilization rate of just 64%.

The circuits are cut 14 and separated from the interlayer 4 sheet and then inserted into the individual laminate interlayer sheet into openings cut to fit the circuits. The assembled laminate is then processed in the same as a standard laminate with heat and pressure applied in an autoclave.

With a larger machine, 1 m×1.2 m, the HWA 8 along with the entire bottom portion of the interlayer 4 can be produced and then spliced to the shorter interlayer sheet at assembly. This is advantageous when a more expensive performance (wedge, solar control, sound deadening, etc.) interlayer 4 required. There is no need for the performance interlayer 4 in the areas of the laminate that are obscured by black paint and the splice is also obscured.

Eight HWA circuits can fit on a 1 m×1.2 m sheet of interlayer 4 as shown in FIG. 5. They can be produced at a rate of 66 per hour (Table 4). Two machines must be operated at a utilization rate of 67%.

In both cases, the capital investment is reduced by replacing four larger machines with two smaller machines. Clean room floor space is saved by reducing the foot print by using fewer and smaller machines as is the storage space required for work in process embedded wire interlayers. One additional person is required during assembly to splice the interlayer but this added labor is offset by the reduction in labor in the wire embedding process.

TABLE 1

|        | Operation   | Meters | Seconds |
|--------|-------------|--------|---------|
|        | Load        |        | 60      |
|        | Tool Change |        | 20      |
| Camera | Bus bars    | 0.2    | 10      |
|        | Tool Change |        | 20      |
| HWA    | Bus bars    | 0.2    | 10      |
|        | Tool Change |        | 20      |
| Camera | Wire        | 3.0    | 13      |
|        | Tool Change |        | 20      |
| HWA    | Wire        | 18.0   | 28      |
|        | Unload      |        | 30      |
|        | Total       |        | 231     |
|        | #/hour      |        | 16      |

TABLE 2

|        | Per Sheet Operation | Meters | Seconds | 60 Seconds |
|--------|---------------------|--------|---------|------------|
|        | Load                |        |         | 60         |
|        | Tool Change         |        | 20      | 20         |
| Camera | Bus bars            | 0.2    | 10.2    | 612        |
|        | Tool Change         |        | 20      | 20         |
| Camera | Wire                | 3      | 13      | 780        |
|        | Unload              |        |         | 30         |
|        | Cycle Time          |        |         | 1,522      |
|        | Each                |        |         | 25         |
|        | #/hour              |        |         | 142        |

TABLE 3

|      | Per Sheet Operation | Meters | Seconds | 10 Seconds |
|------|---------------------|--------|---------|------------|
|      | Load                |        |         | 60         |
|      | Tool Change         |        | 20      | 20         |
| HWA  | Bus bars            | 0.2    | 10.2    | 102        |
|      | Tool Change         |        | 20      | 20         |
| HWA  | Wire                | 18     | 28      | 280        |
|      | Unload              |        |         | 30         |
|      | Cycle Time          |        |         | 512        |
|      | Each                |        |         | 51         |
|      | #/hour              |        |         | 70         |

TABLE 4

|     | Per Sheet Operators | Meters | Seconds | 8 Seconds |
|-----|---------------------|--------|---------|-----------|
|     | Load                |        |         | 60        |
|     | Tool Change         |        | 20      | 20        |
| HWA | Bus bars            | 0.2    | 10.2    | 82        |
|     | Tool Change         |        | 20      | 20        |
| HWA | Wire                | 18     | 28      | 224       |
|     | Unload              |        | 30      | 30        |
|     | Cycle Time          |        |         | 436       |
|     | Each                |        |         | 54        |
|     | #/hour              |        |         | 66        |

The invention claimed is:

1. A process for manufacturing a laminated glazing with embedded circuits, comprising the steps of:
    embedding multiple circuits on a first sheet of interlayer;
    cutting and separating said embedded multiple circuits from said first sheet of interlayer;
    providing a second sheet of interlayer for bonding glass layers of the laminated glazing;
    splicing a cut portion of the second sheet of interlayer with one separated circuit of said embedded multiple circuits to the first sheet of interlayer;
    assembling the layers that are to be part of the laminated glazing; and
    applying heat and pressure to said laminated glazing.

2. The process of claim 1, wherein the circuit is a wire circuit and the wire comprises tungsten wire in the range of about 9 microns to about 125 microns.

3. The process of claim 1, wherein the circuit is a wire circuit and the wire comprises copper wire in the range of about 20 microns to 250 microns.

4. A laminated glazing comprising:
    a portion of a first sheet of interlayer having a first embedded circuit; and
    a second sheet of interlayer for bonding glass layers of the laminated glazing;
    wherein the second sheet of interlayer is spliced to the portion of the first sheet of interlayer having the first embedded circuit;
    wherein the second sheet of interlayer has different properties than that of the first sheet of interlayer.

5. The laminate glazing of claim 4, wherein the second sheet of interlayer is a PVB interlayer.

6. A vehicle comprising the laminate glazing of claim 4.

7. The laminated glazing of claim 4, wherein:
    the second sheet of interlayer comprises a first opening; and
    the portion of the first sheet of interlayer having the first embedded circuit is placed into the first opening of the second sheet of interlayer.

8. The laminated glazing of claim 7, wherein the first embedded circuit and the second embedded circuits are different from each other.

9. The laminated glazing of claim 7, further comprising:
    a portion of a third sheet of interlayer having a second embedded circuit; and
    wherein the second sheet of interlayer comprises a second opening; and
    wherein the portion of the third sheet of interlayer having the second embedded circuit is placed into the second opening of the second sheet of interlayer.

10. The laminated glazing of claim 4, wherein the circuit is a wire circuit and the wire comprises tungsten wire in the range of about 9 microns to about 125 microns.

11. The laminated glazing of claim 4, wherein the circuit is a wire circuit and the wire comprises copper wire in the range of about 20 microns to 250 microns.

12. The laminate glazing of claim 4, wherein the second sheet of interlayer is a performance interlayer selected from the group consisting of wedge interlayer, solar control interlayer, and sound deadening interlayer.

13. The laminate glazing of claim 4, wherein the circuit is a wire circuit and the wire comprises uninsulated copper and/or tungsten wire.

14. The laminated glazing of claim 4, wherein the first embedded circuit is a HWA defroster.

15. The laminated glazing of claim 4, wherein the first embedded circuit is a camera area defroster.

16. The laminated glazing of claim 4, wherein both first embedded circuit and second embedded circuit are wire circuits having different wire sizes.

17. The laminated glazing of claim 9, wherein the first opening and a second opening are made from different sizes.

18. The laminated glazing of claim 4, wherein the circuit is selected from the group consisting of resistive heating circuit, antenna circuit, rain sensing circuit, power supplying circuit, occupant sensing circuit, data transmitting circuit, touch sensitive circuit, lighting circuit and control signal circuit.

19. The process of claim 1, further comprising the steps of:
    cutting a first opening in the second sheet of interlayer; and
    placing the separated circuit of said multiple circuits embedded on the first sheet of interlayer into the first opening of said second sheet of interlayer.

20. The process of claim 19, further comprising the steps of:
    embedding multiple circuits on a third sheet of interlayer;
    cutting and separating said embedded multiple circuits from said third sheet of interlayer;
    cutting a second opening in the second sheet of interlayer; and
    placing the separated circuit of said multiple circuits embedded on the third sheet of interlayer into the second opening of said second sheet of interlayer.

21. The laminated glazing of claim 4, wherein the first embedded circuit of the first sheet interlayer and the second sheet of interlayer have different functionalities and/or comprise wire circuits having different types of wires.

* * * * *